(12) United States Patent
Mao et al.

(10) Patent No.: US 9,361,302 B1
(45) Date of Patent: Jun. 7, 2016

(54) UNIFORM LOGIC REPLICATION FOR DDFS

(71) Applicants: Feng Mao, Sunnyvale, CA (US); Zhaosheng Zhu, Sunnyvale, CA (US)

(72) Inventors: Feng Mao, Sunnyvale, CA (US); Zhaosheng Zhu, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 441 days.

(21) Appl. No.: 13/784,513

(22) Filed: Mar. 4, 2013

(51) Int. Cl.
*G06F 7/00* (2006.01)
*G06F 17/00* (2006.01)
*G06F 17/30* (2006.01)

(52) U.S. Cl.
CPC .................................. *G06F 17/30076* (2013.01)

(58) Field of Classification Search
CPC .................... G06F 17/30067; G06F 17/30206; G06F 17/30224; G06F 17/30575
See application file for complete search history.

(56) References Cited

U.S. PATENT DOCUMENTS

| | | | | |
|---|---|---|---|---|
| 7,672,981 B1* | 3/2010 | Faibish et al. | ........... | 707/999.204 |
| 8,032,491 B1* | 10/2011 | Appellof et al. | .............. | 707/649 |
| 8,635,594 B1* | 1/2014 | Krishnan et al. | ............... | 717/117 |
| 8,806,175 B2* | 8/2014 | Beaman et al. | ................ | 711/216 |
| 8,825,720 B1* | 9/2014 | Xie et al. | ......................... | 707/813 |
| 8,836,548 B1* | 9/2014 | Chandra | ......................... | 341/60 |
| 2006/0112264 A1* | 5/2006 | Agarwal | ......................... | 713/150 |
| 2010/0005312 A1* | 1/2010 | Rom et al. | ..................... | 713/182 |
| 2010/0030840 A1* | 2/2010 | O'Shea et al. | ................ | 709/201 |
| 2010/0064166 A1* | 3/2010 | Dubnicki et al. | .................. | 714/4 |
| 2012/0124046 A1* | 5/2012 | Provenzano | ................... | 707/737 |
| 2012/0124105 A1* | 5/2012 | Provenzano | ................... | 707/813 |
| 2013/0238575 A1* | 9/2013 | Amarendran et al. | ......... | 707/694 |
| 2013/0290850 A1* | 10/2013 | Liu | ................................ | 715/732 |

\* cited by examiner

*Primary Examiner* — Susan Chen
(74) *Attorney, Agent, or Firm* — Blakely, Sokoloff, Taylor & Zafman LLP

(57) ABSTRACT

In one embodiment, the storage system determines if a first format of a first segment tree of the first file system is different from a second format of a second segment tree of the second file system representing a file stored in the first and second file systems, respectively. The storage system identifies, in response to determining that the first and second formats are different, a second level within the first and second segment trees that have different formats. In one embodiment, the storage system further identifies one or more segments of the second level of the first segment tree that have been modified based on a comparison of fingerprints of a third level of the segment trees. For each modified second level segment, the storage system resegments the segment from the first to the second format, and replicates the resegmented segments to the target storage system.

15 Claims, 10 Drawing Sheets

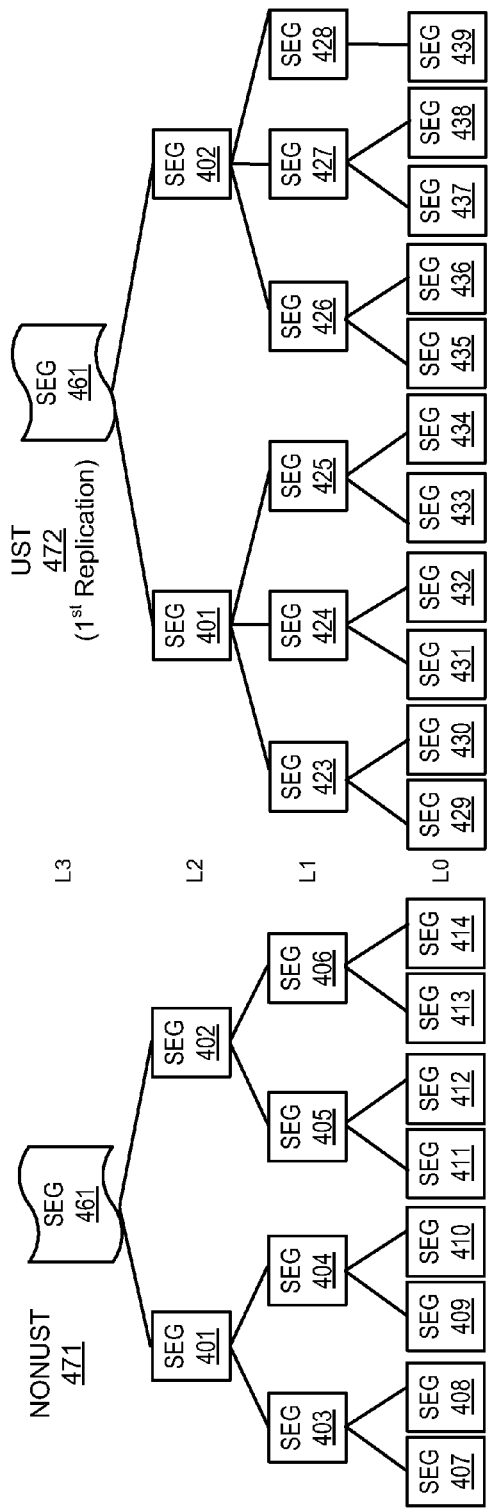
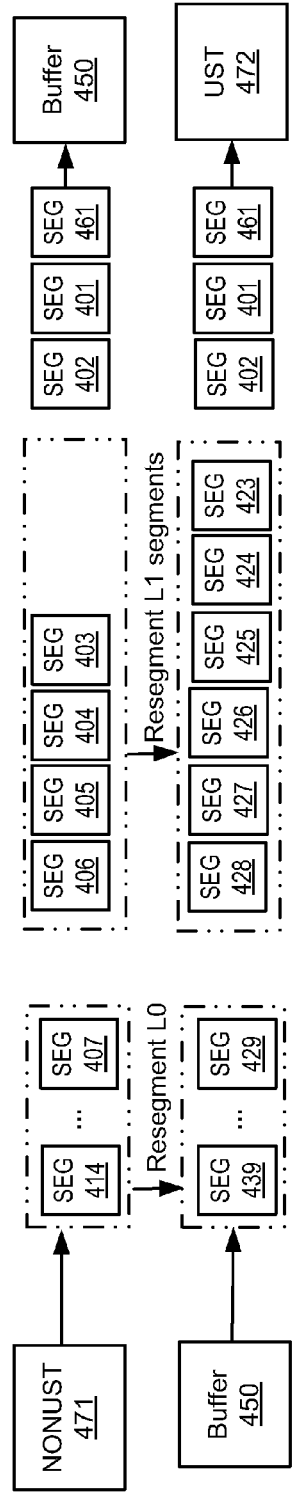
FIG. 4A
FIG. 4B
FIG. 4C

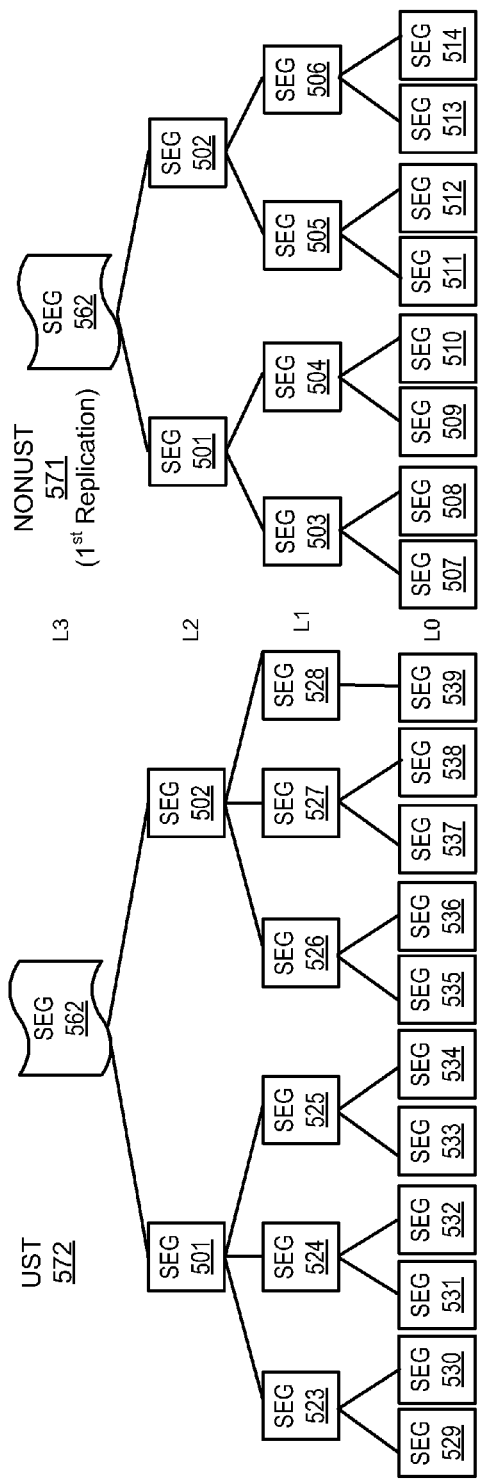
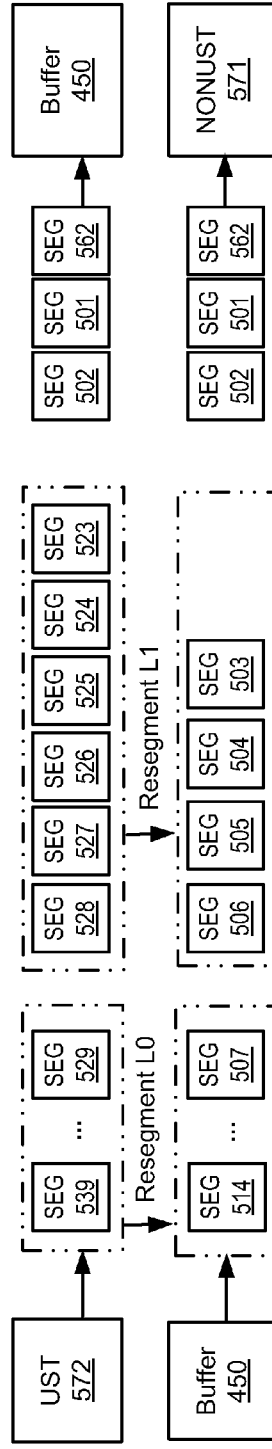
FIG. 5A
FIG. 5B
FIG. 5C

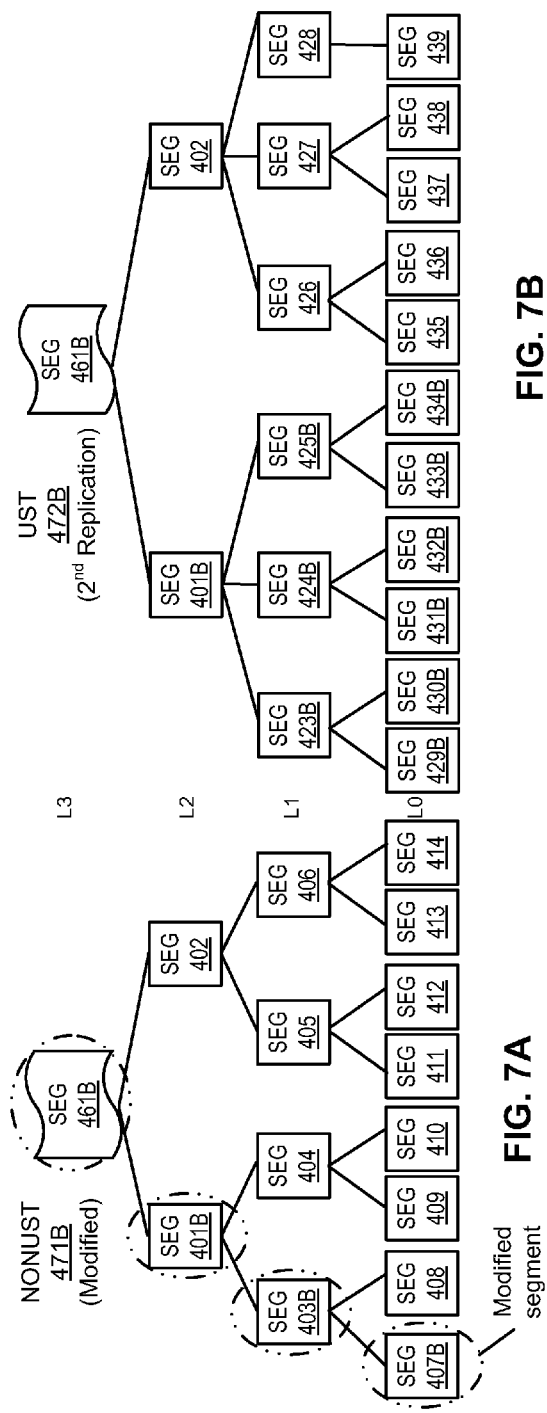
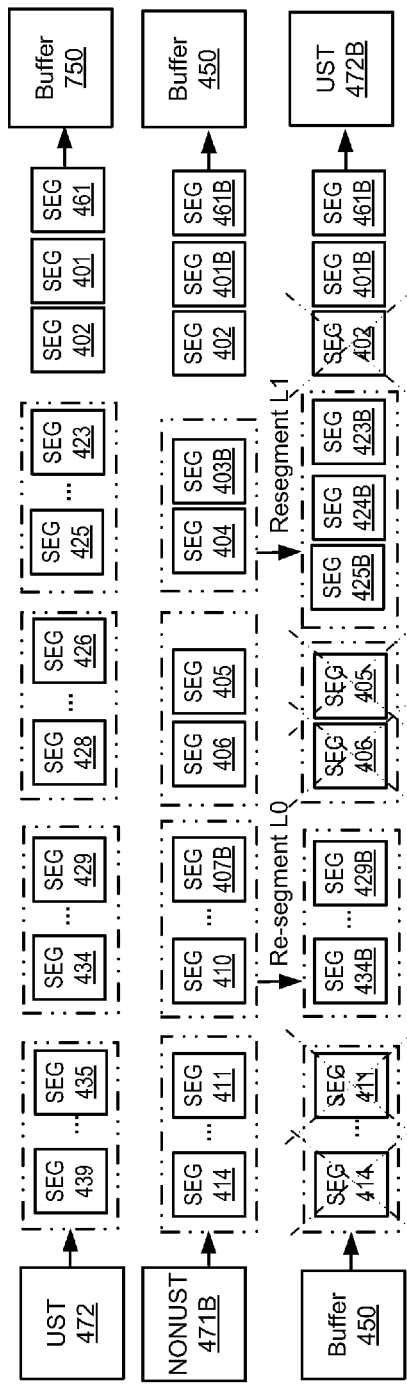
FIG. 7A
FIG. 7B
FIG. 7C

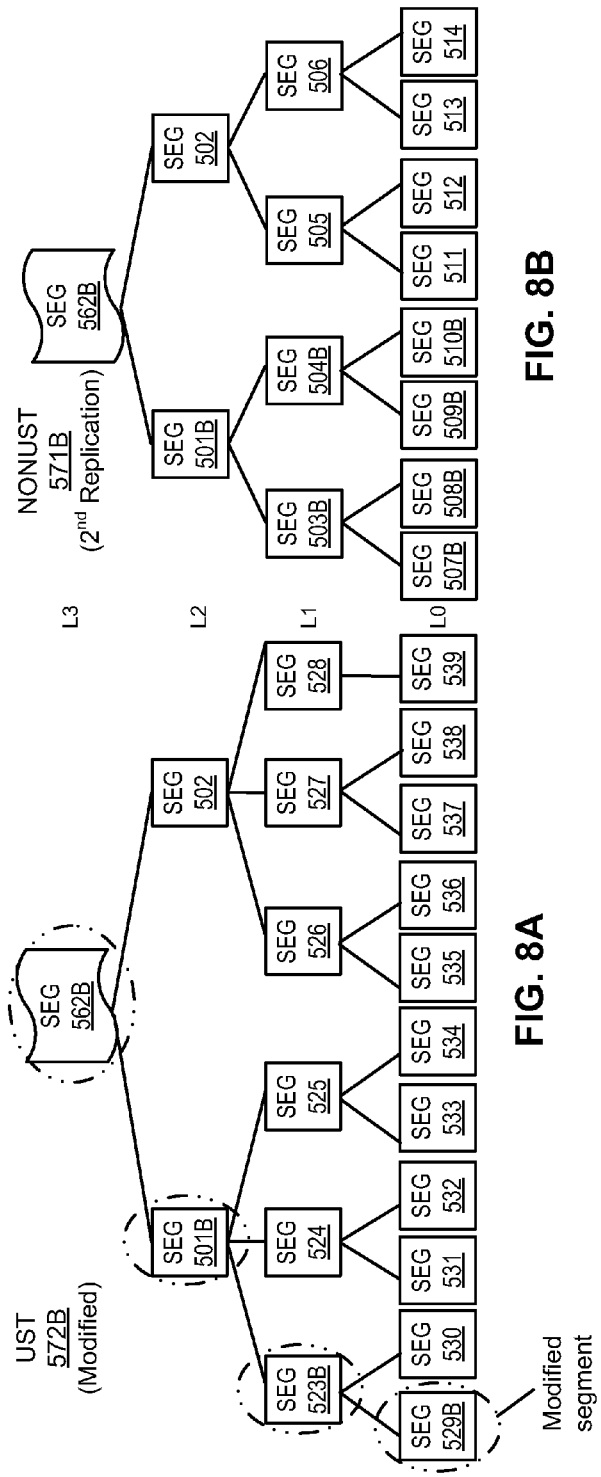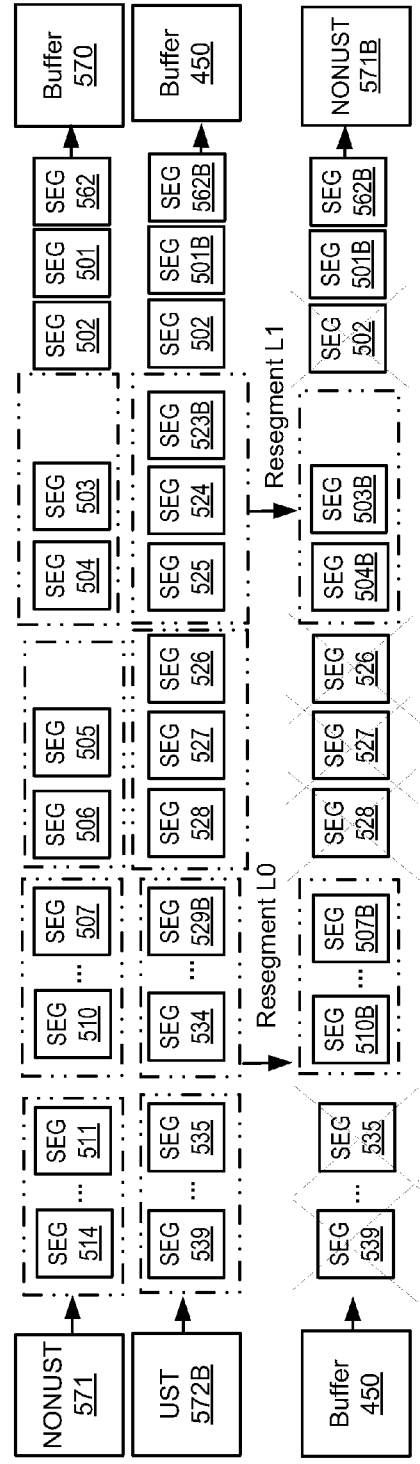
FIG. 8A
FIG. 8B
FIG. 8C

900

Determine if a first format of a first segment tree of the first file system is different from a second format of a second segment tree of a second file system representing a file stored in the first and second file systems, respectively.
905

↓

Identify, in response to determining that the first format and second format are different, a second level within the first and second segment trees that have different formats.
910

↓

Identify one or more segments of the second level of the first segment tree that have been modified based on a comparison of fingerprints of a third level of the first and second segment trees.
915

↓

For each modified second level segment, resegmenting the modified second level segment from the first format to the second format.
920

↓

Replicate the modified second level segments in the second format from the source storage system to the target storage system.
925

FIG. 9

UNIFORM LOGIC REPLICATION FOR DDFS

FIELD OF THE INVENTION

Embodiments of the present invention relate generally to data storage systems. More particularly, embodiments of the invention relate to replicating data from a source storage system to a target storage system.

BACKGROUND

File system, such as Data domain file system (DDFS), replication enables recovery of data in situations where data has been destroyed, inadvertently or otherwise. Conventional replicating systems support four replication types which are designed to deal with network interruptions that are common in the wide area network and recover gracefully with very high data integrity and resilience, ensuring that the replicated data is in a stable state. The first type of replication, directory replication, transfers modified deduplicated data of any file or subdirectory within a source system directory that has been configured as a replication source to a directory on a target system that has been configured as a replication target. Directory replication offers flexible replication topologies including system mirroring, bi-directional, many-to-one, one-to-many, and cascaded, resulting in efficient cross-site deduplication. The second type of replication, managed file replication, directly transfers a backup image from a source system to a target system, one at a time upon request from an administrator. This type of replication provides the same cross-site deduplication effects and flexible network deployment topologies as directory replication. The third type of replication, MTree replication, is designed to replicate MTrees between storage systems. MTrees are user-defined logical partitions of the storage systems that enable granular management of the file system. MTree replication creates periodic snapshots at a source system and sends the differences between two consecutive snapshots to a target storage system. MTree replication supports all the topologies supported by directory replication. The fourth type of replication, collection replication, performs whole-system mirroring in a one-to-one topology, continuously transferring changes in the underlying collection (i.e., a set of deduplicated data segments stored on disk) to the target storage system.

Traditionally, backup systems are optimized by only replicating portions of files that have been modified. In such systems, data files are segmented and stored in segment trees. For example, each data file may be represented by a segment tree. Each segment tree includes one or more levels of segments, such that a segment at one level is further segmented into multiple segments which are stored at a lower level. When replication of a file is to be performed, the source storage system traverses the segment tree representing the file to determine which segment(s) have been modified by comparing the segments against segments of a segment tree at a target storage system that represents the same file.

Currently, the segment trees are implemented in several formats/structures. In some storage systems, segment trees are implemented in a format known as universal segment tree (UST). Segment trees of other storage systems, however, are implemented in what is known as non-universal segment tree (NONUST) format. These formats differ with respect to the segment sizes in one or more of the levels. Thus, replicating between storage systems having different segment tree formats is problematic.

BRIEF DESCRIPTION OF THE DRAWINGS

Embodiments of the invention are illustrated by way of example and not limitation in the figures of the accompanying drawings in which like references indicate similar elements.

FIG. 4A is a block diagram illustrating a NONUST at a source storage system according to one embodiment.

FIG. 4B is a block diagram illustrating a UST at a target storage system according to one embodiment.

FIG. 4C is a block diagram illustrating buffering and translating of segments according to one embodiment.

FIG. 5A is a block diagram illustrating a UST at a source storage system according to one embodiment.

FIG. 5B is a block diagram illustrating a NONUST at a target storage system according to one embodiment.

FIG. 5C is a block diagram illustrating buffering and translating of segments according to one embodiment.

FIG. 7A is a block diagram illustrating a NONUST at a source storage system according to one embodiment.

FIG. 7B is a block diagram illustrating a UST at a target storage system according to one embodiment.

FIG. 7C is a block diagram illustrating buffering and translating of segments according to one embodiment.

FIG. 8A is a block diagram illustrating a UST at a source storage system according to one embodiment.

FIG. 8B is a block diagram illustrating a NONUST at a target storage system according to one embodiment.

FIG. 8C is a block diagram illustrating buffering and translating of segments according to one embodiment.

FIG. 9 is a flow diagram illustrating a method for replicating data from a source storage system to a target storage system according to one embodiment.

DETAILED DESCRIPTION

Figure 1:
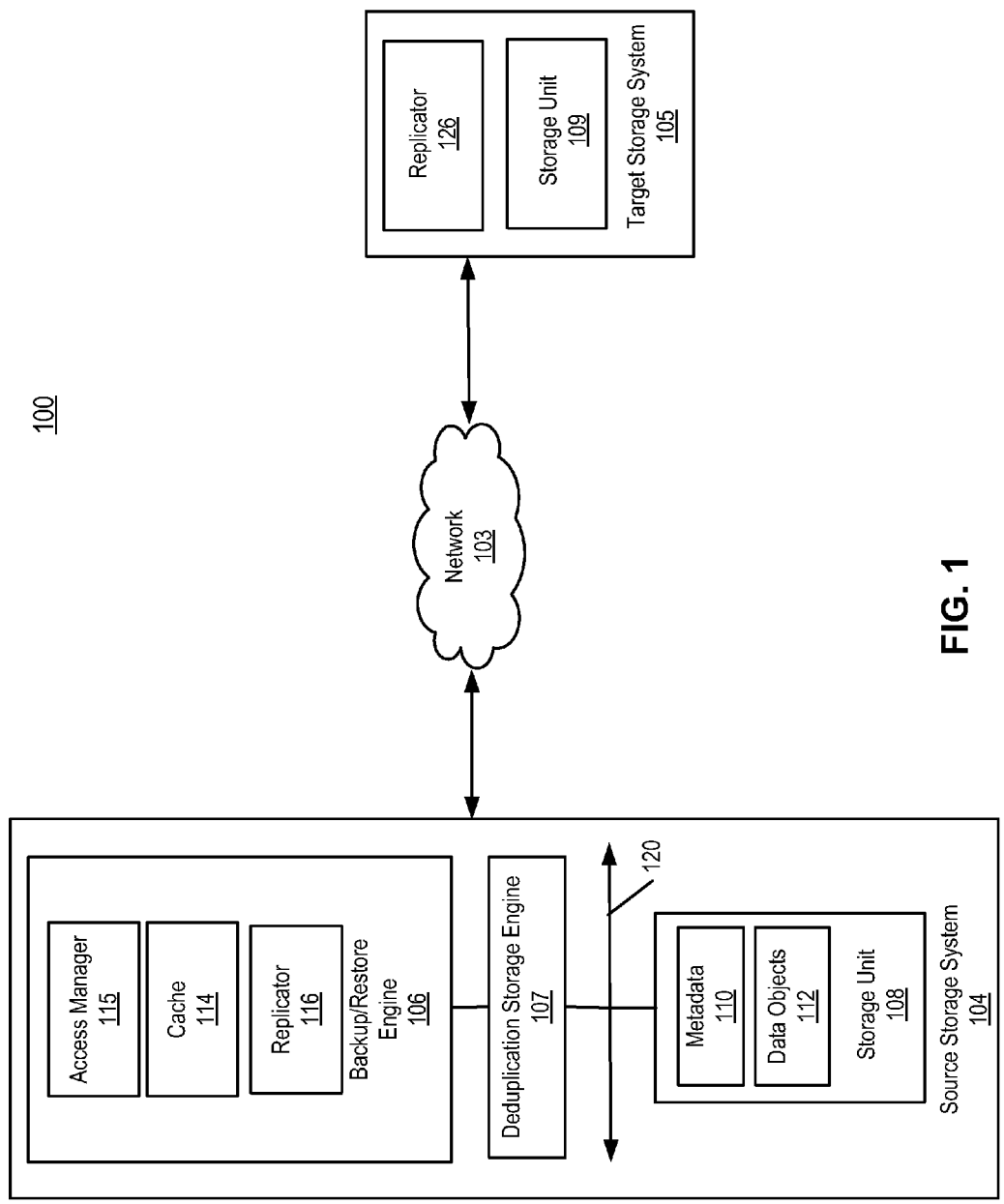
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a data object, such as a file, is stored on a source storage system and the data object is represented by a segment tree that includes one or more levels of segments (e.g., deduplicated segments). In some embodiments, each level of the segment tree includes one or more segments of the file. Each segment of a level is further segmented into multiple segments and stored at a lower level of the same segment tree. In one embodiment, fingerprints are generated for each segment using a collision-resistant hash function, e.g., a SHA-1 hash. Replication or migration of the data object from the source storage system to a target storage system is then initiated.

In one embodiment, the source storage system queries the target storage system if the file exists at the target, e.g., by providing the target storage system with a file identifier (ID) identifying the file. In one embodiment, the source storage system determines that the data object does not exist at the target storage system based on a response provided by the target storage system. In such an embodiment, the source storage system sends the entire data object to the target system. In one embodiment, the format of the segment tree at the source storage system (which shall herein be referred to simply as the source format) is different from the format of the segment tree at the target storage system (which shall herein be referred to simply as the target format). In such an embodiment, the source storage system translates or resegments the segments from the source format to the target format and sends the new segments over to the target storage system.

In one embodiment, the data object at the source storage system is then modified, and replication of the file is again initiated. In such an embodiment, the source storage system again queries the target storage system if the file exists at the target. The source storage system determines that the file already exists at the target storage system based on a response provided by the target storage system. In one embodiment where the file already exists at the target storage system, the source system identifies which segment(s) of the file has been modified by comparing the fingerprints of the segments of the source segment tree against fingerprints of the target segment tree representing the same data object. In one embodiment, the identified segments are transmitted to the target storage system. In an embodiment where the source and target formats are different, the source storage system translates the identified segments before replicating the translated segments to the target storage system. In one embodiment, the target storage system updates the segment tree using the received segments. Throughout the description, replication is discussed with respect to a file. It will be appreciated, however, that the replicating mechanisms of the present invention is not so limited. The replicating mechanisms discussed herein are equally applicable to any data object on a file system. Also note that throughout this application, replication or backup is utilized as an example of data movements between a source storage system and a target storage system. However, the techniques described herein can also be applied to other types of data movements, such as, for example, data migration. A storage system can be a source storage system, a target storage system, or both dependent upon the directions of the data movements under the specifica circumstances.

Referring now to the Figures in which like numerals represent the same or similar elements, and initially to FIG. 1, which is a block diagram illustrating a storage system according to one embodiment of the invention. Referring to FIG. 1, system 100 includes, but is not limited to, source storage system 104 communicatively coupled to target storage system 105 over network 103. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage systems 104-105 may include any type of server or cluster of servers (e.g., cloud servers). For example, source storage system 104 may be a storage server used for any of various different purposes, such as to provide multiple users with access to shared data and/or to back up mission critical data. Source storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 may have a distributed architecture, or all of its components may be integrated into a single unit. Source storage system 104 may be implemented as part of an archive and/or backup system such as a deduplicating storage system available from EMC® Corporation of Hopkinton, Mass.

In one embodiment, source storage system 104 includes, but is not limited to, backup/restore engine 106, deduplication storage engine 107, and storage unit 108 communicatively coupled to each other. Storage unit 108 may be implemented locally (e.g., single node operating environment) or remotely (e.g., multi-node operating environment) via interconnect 120, which may be a bus and/or a network. In one embodiment, storage unit 108 operates as an active storage to receive and store external or fresh user data. Storage unit 108 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage unit 108 may also be combinations of such devices. In the case of disk storage media, the storage unit 108 may be organized into one or more volumes of Redundant Array of Inexpensive Disks (RAID).

In response to a data file to be stored in storage unit 108, deduplication storage engine 107 is configured to segment the data file into multiple segments according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner within storage unit 108. Data stored in the storage unit may be stored in a compressed form (e.g., lossless compression: Huffman coding, Lempel-Ziv Welch coding; delta encoding: a reference to a segment plus a difference; etc.).

The metadata, such as metadata 110, may be stored in storage unit 108, such that files can be accessed independent of another storage unit. Metadata of each storage unit includes enough information to provide access to the files it contains. In one embodiment, metadata may include fingerprints contained within data objects 112, where a data object may represent a data segment, a compression region (CR) of data segments, or a container of one or more CRs. Fingerprints are mapped to a particular data object via metadata 110, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, the source storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, backup engine 106 includes cache 114, access manager 115, and replicator 116. Access manager 115 is to provide file services to a variety of clients, such as a backup/restore application, to backup files stored in storage unit 108, in this example, represented as data objects 112 that are deduplicated by deduplication storage engine 107. Typically, when a request is received to access a file such as a backup file, data objects of the requested file are loaded into a memory of source storage system 104. Since the file may be large, only a portion of data objects of the file is loaded or cached in the memory at a time for accessing.

In one embodiment, replicator 116 is responsible for replicating, i.e., archiving, data stored on storage unit 108 onto a target storage system. For example, replicator 116 may be configured to replicate data on storage unit 108 onto target storage system 105. It will be appreciated, however, that system 100 is not limited to replicating data from one source storage to another one target storage. For instance, replicator 126 of target storage system may also be configured to replicate data on storage unit 109 onto storage unit 108, in which case storage system 105 acts as the "source" and system 104 acts as the "target". For the sake of simplicity, throughout the description replication shall be discussed in the context of storage system 104 and storage system 105 as source and target, respectively.

According to one embodiment, replicators 116 and 126 are configured to manage a segment tree for each file stored on their respective storage units. A segment tree may be in a universal segment tree (UST) format/structure or a non-UST (NONUST) format. In one embodiment, source storage system 104 and target storage system 105 may be configured to utilize different formats (e.g., different sizes of segments, tree structures, compression methods, etc.). In such an embodiment, replicator 116 is configured to translate/resegment the segments from its local format to the format being used by target storage system 105. In one aspect of such an embodiment, replicators 116 and 126 are configured to communicate with each other and exchange information regarding the format being utilized. In an embodiment where segment resegmenting is necessary, replicator 116 may fetch segments from its storage unit and store them in a buffer, e.g., cache 114, and resegment them online (i.e., on the fly) as they are dequeued from the buffer, and send the resegmented segments to target storage system 105.

Figure 2:
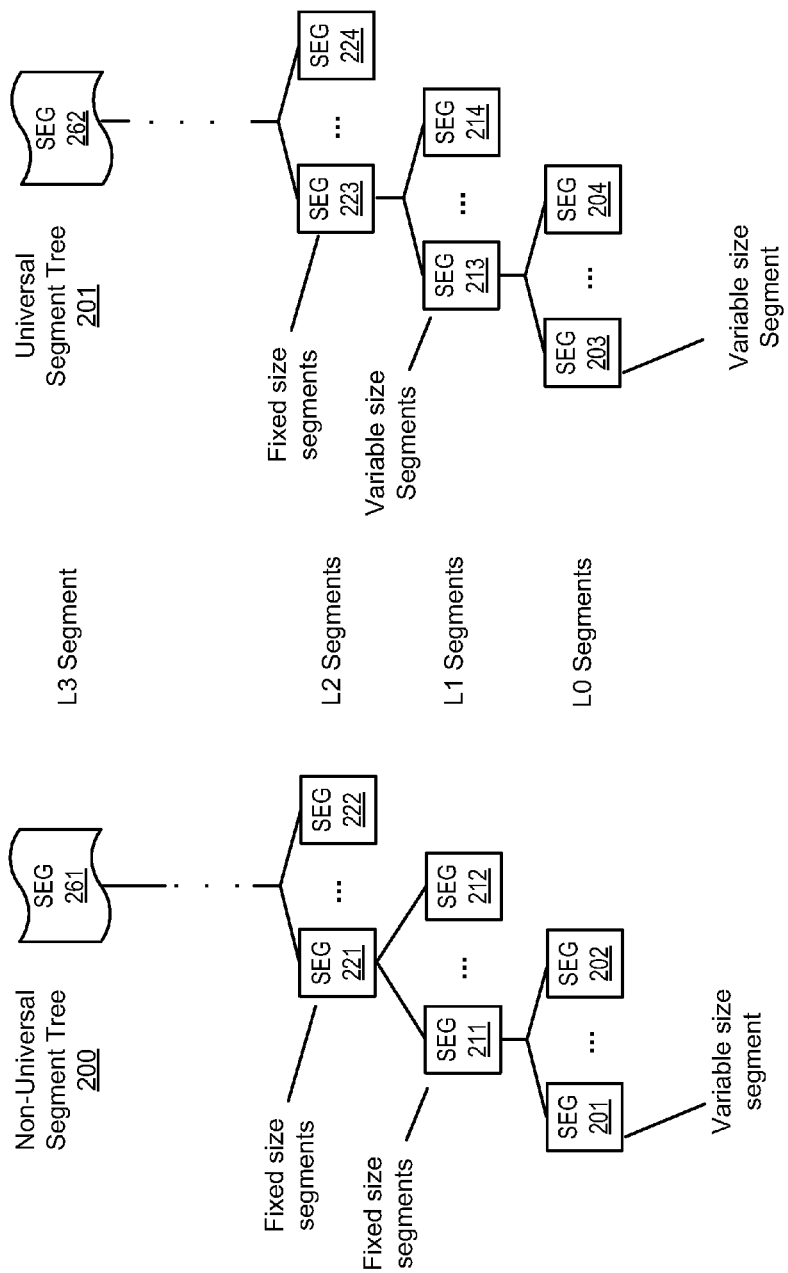
FIG. 2 is a block diagram illustrating UST and NONUST segment trees.

FIG. 2 is a block illustrating an embodiment of NONUST and UST formats. NONUST 200 and UST 201 include multiple hierarchies/levels of segments of a file, each level including segments that are further segmented into two or more segments of a lower level. For example, NONUST 200 includes four levels: L3, L2, L1, and L0. L3 includes one segment 261 representing an entire file, a directory of one or more files, or a virtual machine, stored on the system; L3 segment 261 is segmented into two or more L2 segments (e.g., L2 segments 221-222); each L2 segment, in turn, is segmented into two or more L1 segments (e.g., L1 segments 211-212), and each L1 segment is further segmented into two or more L0 segments (e.g., L0 segments 201-202). UST 201 has a format which is similar to NONUST 200. For instance, UST 201 includes four levels: L3, L2, L1, and L0. L3 includes one segment 262 representing an entire file stored on the system; L3 segment 262 is segmented into two or more L2 segments (e.g., L2 segments 223-224); each L2 segment, in turn, is segmented into two or more L1 segments (e.g., L1 segments 213-214), and each L1 segment is further segmented into two or more L0 segments (e.g., L0 segments 203-204).

In one embodiment, NONUST 200 and UST 201 are different with respect to the size of the segments. In one embodiment where the sizes of the segments are different, L1 segments of NONUST 200 may be fixed at a particular size, e.g., 4-megabyte (MB), while a corresponding level of segments, e.g., level L1 of UST 201, may have a variable size. In such an embodiment, each UST L1 segment may have a different size from each other. Alternatively, all UST L1 segments may be configured to be the same size which is different from the size of NONUST L1 segments. In one embodiment, NONUST 200 and UST 201 both have L0 segments that are variable in size.

In one embodiment, a fingerprint is generated for each segment of the segment tree, e.g., by using a collision-resistant hash function such as SHA-1 hash function. In such an embodiment, the fingerprints are arranged/structured in a format that is identical to its segment tree format. In one embodiment, in order to optimize the backup process, replication is only performed on segments that have been modified since the last replication. In order to determine if a file on a source storage system has been modified since the last replication, each fingerprint on the source storage system is compared against a corresponding fingerprint on the target storage system. In one embodiment, fingerprint comparison is performed by replicator 116 starting at the highest level, e.g., level L3 and descends down each branch that includes a mismatched fingerprint.

By way of example, assume that replication of NONUST 200 to UST 201 has been initiated, and a data chunk/segment corresponding to L0 segment 201 has changed since the last replication. In such a scenario, a new fingerprint would be generated for L0 segment 201, which would have a ripple effect up the segment tree, causing L1 segment 211, L2 segment 221, and L3 segment 261, to all have new fingerprints. In this example, replicator 116 compares L3 fingerprints of NONUST 200 and UST 201, and determines that they are different, indicating the file has been modified since the last replication. However, rather than replicating the entire segment tree, replicator 116 compares the L2 segments of the source and target segment trees. In this example, replicator determines that L2 segments 221 and 223 are different, but L2 segments 222 and 224 are the same. Thus, replicator 116 descends down the mismatched branch of the tree and compares L1 segment 211 against L1 segment 213, and L1 segment 212 against L2 segment 214. In this example, replicator 116 determines that L1 segments 211 and 213 are mismatched, while L1 segments 212 and 214 match. Replicator 116 continues to descend down the mismatched branch of the trees and compares L0 segment 201 against 203, and L0 segment 202 against 204. In this example, replicator 116 determines that L0 segments 201 and 203 are different, while L0 segments 202 and 204 match. As a result, replicator 116 replicates mismatched L3 segment 261, L2 segment 221, L1 segment 211, and L0 segment 201, by sending them to the target storage system.

One advantage of a fixed segment size is simplicity. A conventional file system can create fixed-size blocks in the usual way and a deduplication process can then be applied to deduplicate those fixed-size blocks or segments. The approach is effective at deduplicating whole files that are identical because every block of identical files will of course be identical.

However, replication is optimized through the use of variable sized segments. In backup applications, files are rarely entirely identical during each successive backup of the same file system. A single addition, deletion, or change of the file can easily shift the remaining image content. The shift would cause each fixed sized segment to be different than it was last time, containing some bytes from one neighbor and giving up some bytes to its other neighbor. The approach of partitioning the data into variable length segments based on content allows a segment to grow or shrink as needed so the remaining segments can be identical to previously stored segments. Thus, backup is optimized because fewer segments would have to be replicated since a change in a file would not necessarily result in a change to all segments.

As discussed above, there are advantages using segment tree formats that have variable sized segments. Thus, some storage systems have begun using UST formats, which include two or more levels having variable-sized segments. Other storage systems, however, continue to use NONUST formats. Consequently, in backing up data, replicators, such as replicator 116, are required to translate between formats if necessary.

Figure 3:
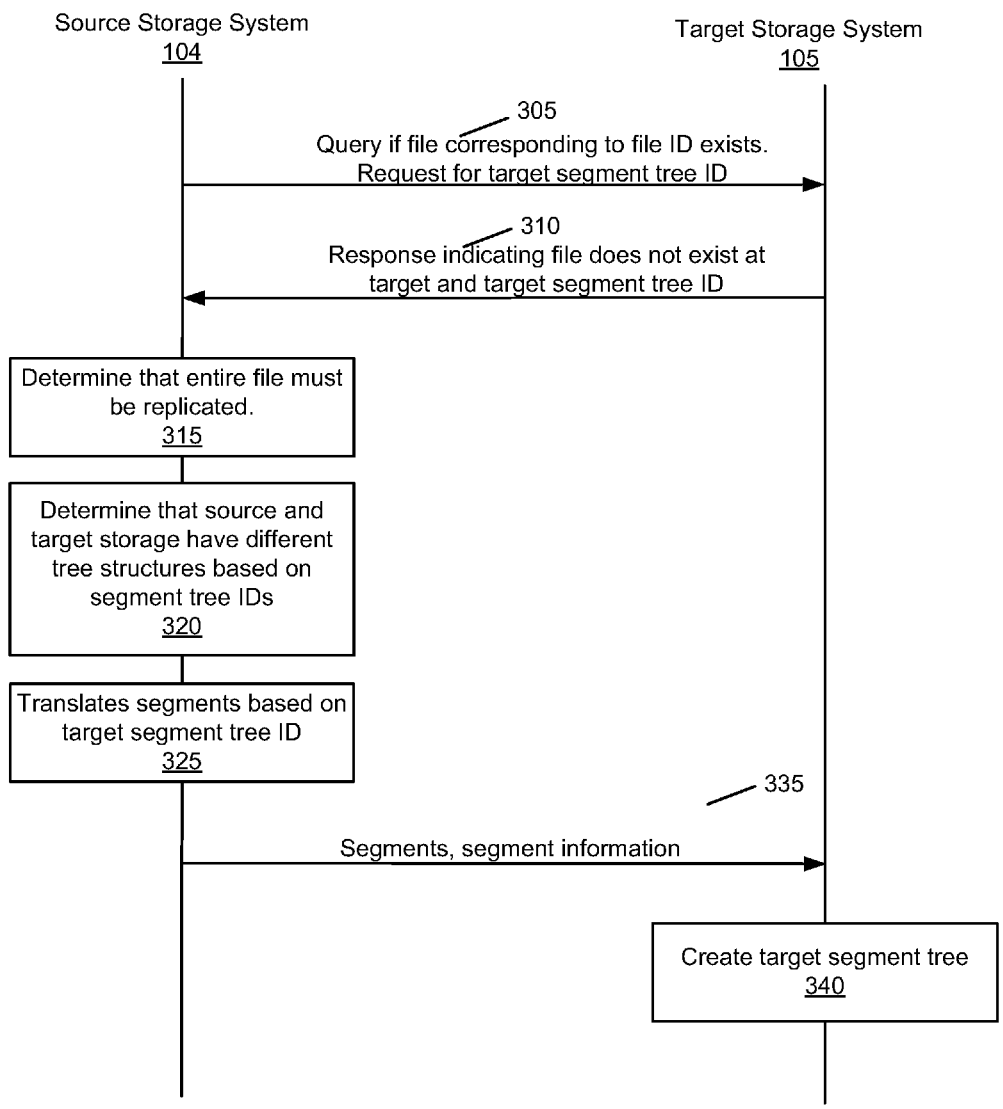
FIG. 3 is a transaction diagram illustrating a process flow for replicating data from a source storage system to a target storage system according to one embodiment.

FIG. 3 is a transaction diagram illustrating a processing flow 300 for replicating a file from source storage system 104 to target storage system 105. In one embodiment, process flow 300 is initiated by a request from a system administrator. In another embodiment, process flow 300 may be initiated when a change is made to a file. In yet another embodiment, process 300 may be initiated at periodic intervals of time, which may be configured by a system administrator.

Referring now to FIG. 3, at transaction 305, source storage system 104 queries if the file to be replicated exists at the target storage system 105. In one embodiment, source storage system 104 provides information, e.g., a file identifier (ID), that identifies the file being queried about. In one embodiment, during transaction 305, source storage system 104 also requests for a segment tree identifier (ID) which identifies the format of the segment tree utilized by target storage system 105.

At transaction 310, target storage system 105 determines that a file identified by the file ID does not exist at the target storage system 105, and sends a response to source storage system 104 indicating the file does not exist. In one embodiment, during transaction 310, target storage system 105 also sends its segment tree ID to source storage system 104.

During operation 315, in response to receiving the response indicating the file does not exist at the target storage system 105, source storage system 104 determines that the entire file must be replicated. During operation 320, source storage system 104 determines that the segment tree format of target storage system 105 is different from its local segment tree format, based on the target segment tree ID received during transaction 310.

During operation 325, in response to determining that the segment tree format of the target storage system 105 is different from its local segment tree format, source storage system 104 translates/resegments one or more local/source segments into a format that is acceptable by target storage system 105, based on the received target segment tree ID. During transaction 335, source storage system 104 replicates the segments by sending the segments (some of which have been translated) to target storage system 105. In one embodiment, source storage system 104 also sends information regarding the segments to target storage system 105. The sent information includes, but is not limited to, file ID (identifying the file that the segments belong to, which, in one embodiment, may be used to identify the target segment tree representing the file), branch level ID (identifying the branch level that a sent segment belongs to), segment ID (identifying the location of the segment within each level). The list of information discussed above is only intended for illustrative purposes, and not intended to be a limitation of the present replicating mechanism. It will be appreciated that more or less information regarding the segments may be exchanged between the source and target storage system. For example, in some embodiments, source storage system 104 may also send the fingerprints corresponding to the sent segments to target storage system 105. In other embodiments, target storage system 105 generates its own fingerprints based on the received segments. During operation 340, target storage system 105 creates a segment tree based on the received segments and segment information. Process flow 300 may be further clarified by way of example through FIGS. 4A-4C, and FIGS. 5A-5C.

FIGS. 4A-4C are block diagrams illustrating one embodiment of replicating a file from source storage system 104 to target storage system 105. In particular, FIG. 4A illustrates NONUST 471 stored at source storage system 104, and FIG. 4B illustrates UST 472 stored at target storage system 105 after NONUST 471 has been replicated. FIG. 4C illustrates buffering and translating/resegmenting of segments from NONUST 471 into UST 472. The operations of FIG. 4C may be implemented as part of operations of FIG. 3.

Referring now to FIG. 4C, which in one embodiment, is performed by replicator 116 of source storage system 104. As illustrated in the top row of FIG. 4C, in response to determining that the entire file must be replicated (e.g., as part of operation 315 of FIG. 3), replicator 116 fetches segments from NONUST 471 of source storage system 104 and "pushes" (i.e., writes) them into buffer 450, which may be implemented as part of cache 114. In one embodiment, the segments are pushed into buffer 450 in the order based on the levels to which they belong. For example, as illustrated, L3 segment 461 is pushed first into buffer 450, followed by L2 segments 401-402, followed by L1 segments 403-406, and finally by L0 segments 407-414.

In one embodiment, segments are "popped" (i.e., read) out of buffer 450 in the same order they were pushed in, e.g., buffer 450 may be implemented as a "first-in-first-out" (FIFO) buffer. In one embodiment, as segments are popped out of buffer 450 (as illustrated in the bottom row of FIG. 4C), one or more of the segments are translated/resegmented (e.g., because replicator 116 determines, during operation 320 of FIG. 3, that target storage system 105 uses a different segment tree format). In one embodiment, replicator 116 translates the segments popped out of buffer 450 based on the target segment tree format (which, for example, may be indicated by the target segment tree ID received during transaction 310 of FIG. 3). In one embodiment, not all segments popped out of buffer 450 are translated. For example, as L3 segment 461 and L2 segments 401-402 are popped out of buffer 450, they are transmitted to target storage system 105 without any translation/resegmenting, because the L3 segments of the source segment tree are the same size as the L3 segments of the target segment tree, and the L2 segments of the source segment tree are the same size as the L2 segments of the target segment tree. In one embodiment, target storage system 105 uses the received L3 and L2 segments and segment information (e.g., information received during transaction 335 of FIG. 3) to create a new segment tree UST 472 (e.g., as part of operation 340 of FIG. 3) to represent the file.

However, as L1 segments are popped out of buffer 450, replicator 116 determines that translation from NONUST 471 to UST 472 format is necessary based on the target segment tree ID. In one embodiment, translation/resegmenting of L1 segments include dividing/splitting up the L1 segments into smaller L1 segments having size(s) that are acceptable by target storage system 105, i.e., the size(s) must conform to the size(s) of UST 472. Depending on the size of NONUST 471 L1 segments and the acceptable size(s) of UST 472 L1 segments, it may be necessary and/or more efficient to first combine NONUST 471 L1 segments and then divide up the combined segments into L1 segments having size(s) that conform to UST 472. As illustrated in FIG. 4C, when NONUST 471 L1 segments 403-406 are popped out of buffer 450, replicator 116 resegments them into UST 472 L1 segments 423-428, and sends over to target storage system 105, which stores them as part of UST 472. Similarly, when NONUST 471 L0 segments 407-414 are popped out of buffer 450, replicator 116 resegments them into UST 472 L0 segments 429-439 and sends them over to target storage system 105, which stores them as part of UST 472.

FIG. 4C illustrates that translating NONUST L1 and L0 segments into UST L1 and L0 segments involve splitting up the NONUST L1 and L0 segments into smaller segments. However, it will be appreciated that the translation by replicator 116 is not so limited. Replicator 116 is capable of performing translation of segments of any level of NONUST to UST format, not just level L1 and L0. It will be further appreciated that replicator 116 is not limited to resegmenting local segments into smaller segments. For example, in an embodiment where UST L1 and/or L0 segments are configured to be larger than NONUST L1 and/or L0 segments, respectively, replicator 116 would combine NONUST L1 and/or L0 segments as part of the translation process, rather than dividing them up, before sending the translated segments over to target storage system 105.

In some embodiments, all segments from NONUST 471 are pushed into buffer 450 before they are popped and translated. Such an embodiment relaxes the coordination requirements between the logic responsible for pushing and popping the segments. However, resources may not permit all segments to be pushed and stored in buffer 450. Thus, alternatively, replicator 116 may be configured to pop segments out of buffer 450 as soon as they become available, and as soon as target storage system is ready to receive. Such an embodiment relaxes the buffering requirement of buffer 450. However, it does increase the complexity in replicator 116, e.g., because it has to constantly monitor the status of buffer 450.

FIG. 4C illustrates segments being pushed and popped out of a single buffer 450. However, it will be appreciated that the buffering scheme of the present invention is not so limited. Replicator 116 may, for example, utilize multiple buffers for buffering the segments during replication. It will be further appreciated that replicator 116 is not limited to popping out of buffer 450 and translating the segments online (i.e., on-the-fly). For example, replicator 116 may pop NONUST 471 segments out of buffer 450, translate them to UST segments, and buffer the UST segments in another buffer prior to sending them over to target storage system 105. It would be obvious to one having ordinary skill in the art that various other buffering schemes are available, and such widely known buffering mechanisms may be implemented without departing from the broader spirit and scope of the invention.

FIGS. 5A-5C are block diagrams illustrating one embodiment of replicating a file from source storage system 104 to target storage system 105. In particular, FIG. 5A illustrates UST 572 stored at source storage system 104, and FIG. 5B illustrates NONUST 571 stored at target storage system 105 after UST 572 has been replicated. FIG. 5C illustrates buffering and translating/resegmenting of segments from UST 572 into NONUST 571. The operations of FIG. 5C may be implemented as part of operations of FIG. 3.

Referring now to FIG. 5C, which in one embodiment, is performed by replicator 116 of source storage system 104. As illustrated in the top row of FIG. 5C, in response to determining that the entire file must be replicated (e.g., as part of operation 315 of FIG. 3), replicator 116 fetches segments from UST 572 of source storage system 104 and pushes them into buffer 450, which may be implemented as part of cache 114. In one embodiment, the segments are pushed into buffer 450 in the order based on the levels to which they belong. For example, as illustrated, L3 segment 562 is pushed first into buffer 450, followed by L2 segments 501-502, followed by L1 segments 523-528, and finally by L0 segments 529-539.

In one embodiment, as segments are popped out of buffer 450 (as illustrated in the bottom row of FIG. 5C), one or more of the segments are translated/resegmented (e.g., because replicator 116 determines, during operation 320 of FIG. 3, that target storage system 105 uses a different segment tree format). In one embodiment, replicator 116 translates the segments popped out of buffer 450 based on the target segment tree format (which, for example, may be indicated by the target segment tree ID received during transaction 310 of FIG. 3). For example, as L3 segment 562 and L2 segments 501-502 are popped out of buffer 450, they are transmitted to target storage system 105 without any translation/resegmenting, because the L3 segments of the source segment tree are the same size as the L3 segments of the target segment tree, and the L2 segments of the source segment tree are the same size as the L2 segments of the target segment tree. In one embodiment, target storage system 105 uses the received L3 and L2 segments and segment information (e.g., information received during transaction 335 of FIG. 3) to create a new segment tree NONUST 571 (e.g., as part of operation 340 of FIG. 3) to represent the file.

However, as L1 segments are popped out of buffer 450, replicator 116 determines that translation from UST 572 to NONUST 571 format is necessary based on the target segment tree ID. In one embodiment, translation/resegmenting of L1 segments include resegmenting the UST L1 segments into NONUST L1 segments having size(s) that are acceptable by target storage system 105, i.e., the size(s) must conform to the size of NONUST 571. Depending on the size(s) of UST 572 L1 segments and the size of NONUST 571 L1 segments, it may be necessary and/or more efficient to first combine UST 572 L1 segments and then divide up the combined segments into L1 segments having size(s) that conform to NONUST 571. As illustrated in FIG. 5C, when UST 572 L1 segments 523-528 are popped out of buffer 450, replicator 116 combines them, and resegments the combined segments into NONUST 571 L1 segments 503-506, and sends them over to target storage system 105, which stores them as part of NONUST 571. Similarly, when UST 572 L0 segments 529-539 are popped out of buffer 450, replicator 116 combines and resegments them into NONUST 571 L0 segments 507-514 and sends them over to target storage system 105, which stores them as part of NONUST 571.

FIG. 5C illustrates that translating UST L1 and L0 segments into NONUST L1 and L0 segments involve combining and splitting up the combined UST L1 and L0 segments into larger segments. However, it will be appreciated that the translation by replicator 116 is not so limited. Replicator 116 is capable of performing translation of segments of any level of UST to NONUST format, not just level L1 and L0. It will be further appreciated that replicator 116 is not limited to resegmenting local segments into larger segments. For example, in an embodiment where UST L1 and/or L0 segments are configured to be larger than NONUST L1 and/or L0 segments, respectively, replicator 116 may divide UST L1 and/or L0 segments into smaller segments.

Figure 6:
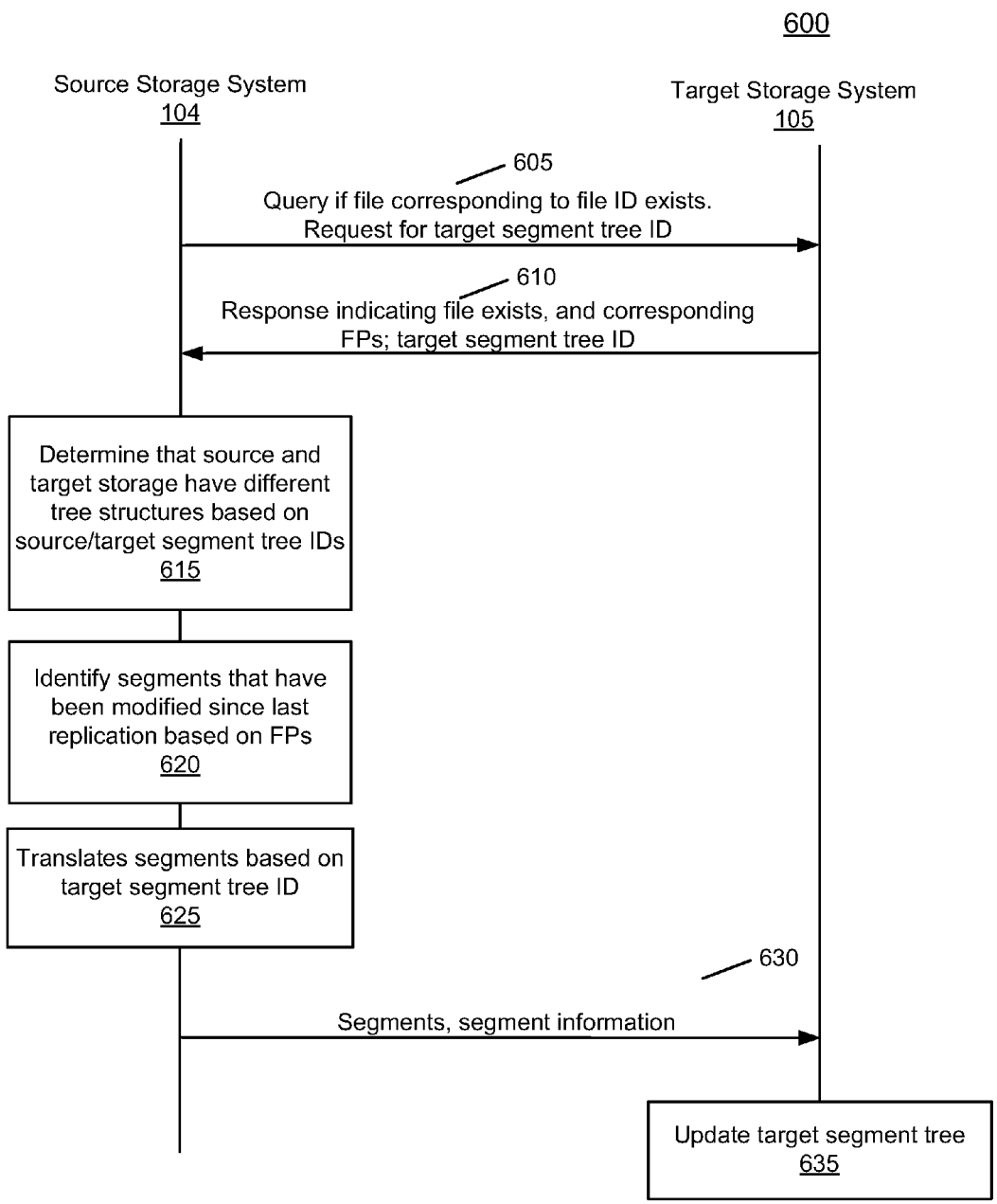
FIG. 6 is a transaction diagram illustrating a process flow for replicating data from a source storage system to a target storage system according to one embodiment.

FIG. 6 is a transaction diagram illustrating a processing flow 600 for replicating a file from source storage system 104 to target storage system 105. In one embodiment, process flow 600 is initiated by a request from a system administrator. In another embodiment, process flow 600 may be initiated when a change is made to a file. In yet another embodiment, process flow 600 may be initiated at periodic intervals of time, which may be configured by a system administrator.

Referring now to FIG. 6, at transaction 605, source storage system 104 queries if the file to be replicated exists at the target storage system 105. In one embodiment, source storage system 104 provides information, e.g., a file ID, that identifies the file being queried about. In one embodiment, during transaction 605, source storage system 104 also requests for a segment tree ID which identifies the format of the segment tree utilized by target storage system 105.

At transaction 610, target storage system 105 determines that a file identified by the file ID exists at the target storage system 105, and sends a response to source storage system 104 indicating the file does exist. In one embodiment, target storage system 105 sends the fingerprints of the segments belonging to the segment tree representing the file to source storage system 104. Alternatively, or in addition, target storage system 105 sends the actual data segments of the file to source storage system 104. In one embodiment, during transaction 610, target storage system 105 also sends its segment tree ID to source storage system 104.

During operation 615, source storage system 104 determines that the segment tree format of target storage system 105 is different from its local segment tree format, based on the target segment tree ID received at transaction 610. During operation 620, source storage system 104 identifies the segments of the file that have been modified, e.g., by determining which fingerprints of the source segment tree do not match with the corresponding fingerprints of the target segment tree representing the file. The mismatched fingerprints may be identified using mechanisms similar to those discussed above in the text with respect to FIG. 2.

During operation 625, in response to determining that the segment tree format of the target storage system 105 is different from its local segment tree format, source storage system 104 translates/resegments one or more of the local/source segments into a format that is acceptable by target storage system 105, based on the received segment tree ID. In one embodiment, only segments that have been identified as mismatched during operation 620 are sent to target storage system 105 at transaction 630. In such an embodiment, only mismatched segments are translated during operation 620. In one embodiment, source storage system 104 also sends information regarding the segments to target storage system 105. The sent information includes, but is not limited to, file ID (identifying the file that the segments belong to, which, in one embodiment, may be used to identify the target segment tree representing the file), branch level ID (identifying the branch level that a sent segment belongs to), segment ID (identifying the location of the segment within each level). The list of information discussed above is only intended for illustrative purposes, and not intended to be a limitation of the present replicating mechanism. It will be appreciated that more or less information regarding the segments may be exchanged between the source and target storage system.

For example, in some embodiments, source storage system 104 may also send the fingerprints corresponding to the sent segments to target storage system 105. In other embodiments, target storage system 105 generates its own fingerprints based on the received segments. During operation 635, target storage system 105 updates the segment tree representing the file based on the received segments and segment information. Process flow 600 may be further clarified by way of example through FIGS. 7A-7C, and FIGS. 8A-8C. Throughout the description of FIGS. 7A-7C and FIGS. 8A-8C, the text discusses the comparison of segments as a mechanism for determining whether a segment has been modified since the last replication. It will be appreciated that the comparison of segments may be made by comparing the actual segment data itself, or by comparing the fingerprints representing the segments.

FIGS. 7A-7C are block diagrams illustrating one embodiment of replicating a file from source storage system 104 to target storage system 105. In particular, FIG. 7A illustrates NONUST 471B stored at source storage system 104 which is a modified/updated version of NONUST 471 of FIG. 4A. Particularly, L0 segment 407 of FIG. 4A has been modified since the last replication, resulting in L0 segment 407B of FIG. 7A. FIG. 7B illustrates UST 472B stored at target storage system 105 which is a re-replicated version UST 472 of FIG. 4B. Put differently, FIG. 4B represents the segment tree of target storage system 105 after a first replication of the segment tree at source storage system 104. FIG. 7B represents the segment tree at target storage system 105 after a second replication of the (modified) segment tree at source storage system 104. FIG. 7C illustrates buffering and translating/ resegmenting of segments from modified NONUST 471B into UST 472B. In other words, FIG. 7C illustrates a second replication of the segment tree at source storage system 104 to target storage system 105, the first replication being illustrated by FIG. 4C. The operations of FIG. 7C may be implemented as part of operations of FIG. 6.

The operations of FIG. 7C assume that NONUST 471B has been updated to reflect the modified L0 segment 407B. At least, the fingerprints for L0 segment 407B, L1 segment 403B, L2 segment 401B, and L3 segment 461B have been regenerated based on the modified data chunk corresponding to L0 segment 407B.

Referring now to FIG. 7C, which in one embodiment, is performed by replicator 116 of source storage system 104. As illustrated in the top row of FIG. 7C, segments of UST 472 at target storage system 105 are received (e.g., during transaction 610 of FIG. 6), and pushed into buffer 750, which may be implemented as part of cache 114. In one embodiment, the segments are received and pushed into buffer 750 in the order based on the levels to which they belong. For example, as illustrated, L3 segment 461 is pushed first into buffer 750, followed by L2 segments 401-402, followed by L1 segments 423-428, and finally by L0 segments 429-439. The segments are popped out of buffer 750 in the same order that they were pushed in, i.e., buffer 750 may be implemented as a first-in-first-out (FIFO) buffer.

As illustrated in the middle row of FIG. 7C, in order to determine which, if any segments have been modified (e.g., as part of operation 620 of FIG. 6), replicator 116 fetches segments from NONUST 471B of source storage system 104 and pushes them into buffer 450, which may be implemented as part of cache 114. In one embodiment, the segments are pushed into buffer 450 in the order based on the levels to which they belong. For example, as illustrated, L3 segment 461B is pushed first into buffer 450, followed by L2 segments 401B-402, followed by L1 segments 403B-406, and finally by L0 segments 407B-414.

In one embodiment, segments are popped out of buffers 450 and 750 in a manner such that they align with each other with respect to the level of the segment tree to which they belong, and with respect to the segment location within each level. This allows replicator 116 to compare the source and target segments to determine if a segment has been modified since it was last replicated. For instance, L3 segment 461 is popped out of buffer 750 at the same time that L3 segment 461B is popped out of buffer 450. In some embodiments where the source and target segment trees have different formats, the segments within one or more levels may not correspond with each other. For example, L1 segment 403B of NONUST 471B does not correspond to any particular L1 segment of UST 472 stored in buffer 750 because the L1 segments of the source and target segment trees have been configured to be different sizes. In at least one embodiment, when such an instance occurs, replicator 116 pops all the segments from both buffers that correspond to the same parent segment. Replication is determined, in such an embodiment, based on whether the parent segments of the source and target segment tree match. For example, for the given segment trees as illustrated in FIGS. 7A and 4B, replicator 116 pops L1 segments 403B-404 out of buffer 450 at the same time L1 segments 423-425 are popped out of buffer 750. Replication is determined based on their respective parent segments, L2 segment 401B and L2 segment 401. This is discussed in further details below with respect to FIG. 7C.

In one embodiment, as segments are popped out of buffers 750 and 450, they are compared against each other to determine if the segment has been modified since the last replication (e.g., as part of operation 620 of FIG. 6). For example, replicator 116 determines that L3 segment 461B has been modified because it does not match with L3 segment 461 from buffer 750. As a result, L3 segment 461B is sent to target storage system 105 (e.g., as part of transaction 630 of FIG. 6), which uses the segment to update its UST 472B (e.g., as part of operation 635 of FIG. 6). Note, however, that no translation is necessary because level L3 of both segment trees are configured to have the same size (i.e., operation 625 of FIG. 6 is skipped for L3 segments). Similarly, replicator 116 determines that L2 segment 401B has been modified because it does not match with L2 segment 401 from buffer 750. As a result, L2 segment 401B is sent to target storage system 105, which stores it as part of UST 472B. Note, however, that no translation is necessary because level L2 of both segment trees are configured to have the same size. When L2 segment 402 is popped out of buffer 450 and compared against L2 segment 402 from buffer 750, they match, thus indicating L2 segment 402 has not been modified since the last replication. Accordingly, replicator 116 drops/discards L2 segment 402 by not sending it over to target storage system 105.

In one embodiment, each L1 segment of NONUST 471B does not correspond with a particular UST 472 L1 segment stored in buffer 750. In one aspect of the invention, replicator 116 pops all L1 segments that belong to the same L2 parent segment from buffers 750 and 450 at the same time. For example, replicator 116 pops L1 segments 423-425 from buffer 750 and L1 segments 403B-404 from buffer 450 at the same time. Replicator 116 determines that at least one of L1 segments 403B-404 has been modified because their parent L2 segment 401B does not match with corresponding target L2 segment 401 from buffer 750. Replicator 116 further determines that translation of L1 segments 403B-404 is necessary (e.g., as part of operation 615 of FIG. 6) because the target segment tree format is different from its local/source segment tree format (e.g., based on the target segment tree ID received during transaction 610 of FIG. 6). In one embodiment, replicator 116 translates the segments (e.g., as part of operation 625 of FIG. 6) by dividing/resegmenting them into segments having sizes that are acceptable by target storage system 105. In some embodiments, replicator 116 may be required to combine the L1 segments and then resegmenting the combined segments into new L1 segments, which are then sent over to target storage system 105 (e.g., as part of transaction 630 of FIG. 6). As illustrated in FIG. 7C, NONUST 471B L1 segments 403B-404 are resegmented into new UST 472B L1 segments 423B-425B, which are sent to target storage system 105, which uses them to update UST 472B (e.g., as part of operation 635 of FIG. 6).

Similarly, replicator 116 pops L1 segments 405-406 from buffer 450 at the same time that L1 segments 426-428 are popped from buffer 750. However, replicator 116 determines that L1 segments 405-406 do not need to be replicated because their parent L2 segment 402 matches corresponding target L2 segment 402. As a result, L1 segments 405-406 are dropped and not sent to target storage system 105.

As illustrated in FIG. 7C, replicator 116 pops all L0 segments 407B-410 from buffer 450 at the same time that L0 segments 429-434 are popped from buffer 750 because these segments belong to the same parent L2 segments 401B and 401, respectively. Using similar mechanisms as discussed above, L0 segments 407B-410 are resegmented into new L0 segments 429B-434B, which are sent to target storage system 105 to be stored as part of UST 472B. In the example illustrated by FIG. 7C, replicator 116 pops the remaining L0 segments 411-414 from buffer 450 and L0 segments 435-439 from buffer 750 because they belong to the same parent L2 segments 402 and 402, respectively. Replicator 116 determines that L0 segments 411-414 do not need to be replicated because their parent L2 segment 402 matches corresponding target parent L2 segment 402. Thus, these segments are dropped and not sent to target storage system 105.

FIGS. 8A-8C are block diagrams illustrating one embodiment of replicating a file from source storage system 104 to target storage system 105. In particular, FIG. 8A illustrates UST 572B stored at source storage system 104 which is a modified/updated version of UST 572 of FIG. 5A. Particularly, L0 segment 529 of FIG. 5A has been modified since the last replication, resulting in L0 segment 529B of FIG. 8A. FIG. 8B illustrates NONUST 571B stored at target storage system 105 which is a re-replicated version of NONUST 571 of FIG. 5B. Put differently, FIG. 5B represents the segment tree of target storage system 105 after a first replication of the segment tree at source storage system 104. FIG. 8B represents the segment tree at target storage system 105 after a second replication of the (modified) segment tree at source storage system 104. FIG. 8C illustrates buffering and translating/resegmenting of segments from modified UST 572B into NONUST 571B. In other words, FIG. 8C illustrates a second replication of the segment tree at source storage system 104 to target storage system 105, the first replication being illustrated by FIG. 5C. The operations of FIG. 8C may be implemented as part of operations of FIG. 6.

The operations of FIG. 8C assume that UST 572B has been updated to reflect the modified L0 segment 529B. At least, the fingerprints for L0 segment 529B, L1 segment 523B, L2 segment 501B, and L3 segment 562B have been regenerated based on the modified data chunk corresponding to L0 segment 529B.

Referring now to FIG. 8C, which in one embodiment, is performed by replicator 116 of source storage system 104. As illustrated in the top row of FIG. 8C, segments of NONUST 571 at target storage system 105 are received (e.g., during transaction 610 of FIG. 6), and pushed into buffer 750, which may be implemented as part of cache 114. In one embodiment, the segments are received and pushed into buffer 750 in the order based on the levels to which they belong. For example, as illustrated, L3 segment 562 is pushed first into buffer 750, followed by L2 segments 501-502, followed by L1 segments 503-506, and finally by L0 segments 507-514. The segments are popped out of buffer 750 in the same order that they were pushed in, e.g., buffer 750 may be implemented as a first-in-first-out (FIFO) buffer.

As illustrated in the middle row of FIG. 8C, in order to determine which, if any, segments have been modified (e.g., as part of operation 620 of FIG. 6), replicator 116 fetches segments from UST 572B of source storage system 104 and pushes them into buffer 450, which may be implemented as part of cache 114. In one embodiment, the segments are pushed into buffer 450 in the order based on the levels to which they belong. For example, as illustrated, L3 segment 562B is pushed first into buffer 450, followed by L2 segments 501B-502, followed by L1 segments 523B-528, and finally by L0 segments 529B-539.

In one embodiment, segments are popped out of buffers 450 and 750 in a manner such that they align with each other with respect to the level of the segment tree to which they belong, and with respect to the segment location within each level. This allows replicator 116 to compare the source and target segments to determine if a segment has been modified since it was last replicated. For instance, L3 segment 562 is popped out of buffer 750 at the same time that L3 segment 562B is popped out of buffer 450. In some embodiments where the source and target segment trees have different formats, the segments within one or more levels may not correspond with each other. For example, L1 segment 523B of UST 572B does not correspond to any particular L1 segment of NONUST 571 stored in buffer 750 because the L1 segments of the source and target segment trees have been configured to be different sizes. In at least one embodiment, when such an instance occurs, replicator 116 pops all the segments from both buffers that correspond to the same parent segment. Replication is determined, in such an embodiment, based on whether the parent segments of the source and target segment tree match. For example, for the given segment trees as illustrated in FIGS. 8A and 5B, replicator 116 pops L1 segments 523B-525 out of buffer 450 at the same time L1 segments 503-504 are popped out of buffer 750. Replication is determined based on their respective parent segments, L2 segment 501B and L2 segment 501. This is discussed in further details below with respect to FIG. 8C.

In one embodiment, as segments are popped out of buffers 750 and 450, they are compared against each other to determine if the segment has been modified since the last replication (e.g., as part of operation 620 of FIG. 6). For example, replicator 116 determines that L3 segment 562B from buffer 450 has been modified because it does not match with L3 segment 562 from buffer 750. As a result, L3 segment 562B is sent to target storage system 105 (e.g., as part of transaction 630 of FIG. 6). Note, however, that no translation is necessary because level L3 of both segment trees are configured to have the same size (i.e., operation 625 of FIG. 6 is skipped for L3 segments). Similarly, replicator 116 determines that L2 segment 501B from buffer 450 has been modified because it does not match with L2 segment 501 from buffer 750. As a result, L2 segment 501B is sent to target storage system 105, which stores it as part of NONUST 571B. Note, however, that no translation is necessary because level L2 of both segment trees are configured to have the same size. When L2 segment 502 is popped out of buffer 450 and compared against L2 segment 502 from buffer 750, they match, thus indicating L2 segment 502 has not been modified since the last replication. Accordingly, replicator 116 drops/discards L2 segment 502 by not sending it over to target storage system 105.

In one embodiment, each L1 segment of UST 572B does not correspond with a particular NONUST 571 L1 segment stored in buffer 750. In one aspect of the invention, replicator 116 pops all L1 segments that belong to the same L2 parent segment from buffers 750 and 450 at the same time. For example, replicator 116 pops L1 segments 503-504 from buffer 750 and L1 segments 523B-525 from buffer 450 at the same time. Replicator 116 determines that at least one of L1 segments 523B-525 has been modified because their parent L2 segment 501B does not match with corresponding target L2 segment 501 from buffer 750. Replicator 116 further determines that translation of L1 segments 523B-525 is necessary (e.g., as part of operation 615 of FIG. 6) because the target segment tree format is different from its local/source segment tree format (e.g., based on the target segment tree ID received during transaction 610 of FIG. 6). In one embodiment, replicator 116 translates the segments (e.g., as part of operation 625 of FIG. 6) by resegmenting them into segments having sizes that are acceptable by target storage system 105. In some embodiments, replicator 116 may be required to combine the L1 segments and then resegmenting the combined segments into new L1 segments, which are then sent over to target storage system 105 (e.g., as part of transaction 630 of FIG. 6). As illustrated in FIG. 8C, UST 572B L1 segments 523B-525 are resegmented into new NONUST 571B L1 segments 503B-504B, which are sent to target storage system 105, which uses them to update NONUST 571B (e.g., as part of operation 635 of FIG. 6).

Similarly, replicator 116 pops L1 segments 526-528 from buffer 450 at the same time that L1 segments 505-506 are popped from buffer 750. However, replicator 116 determines that L1 segments 526-528 do not need to be replicated because their parent L2 segment 502 matches corresponding target L2 segment 502. As a result, L1 segments 526-528 are dropped and not sent to target storage system 105.

As illustrated in FIG. 8C, replicator 116 pops all L0 segments 529B-534 from buffer 450 at the same time that L0 segments 507-510 are popped from buffer 750 because these segments belong to the same parent L2 segments 501B and 501, respectively. Using similar mechanisms as discussed above, L0 segments 529B-534 are resegmented into new L0 segments 507B-510B, which are sent to target storage system 105 to be stored as part of NONUST 571B. In the example illustrated by FIG. 8C, replicator 116 pops the remaining L0 segments 535-539 from buffer 450 and L0 segments 511-514 from buffer 750 because they belong to the same parent L2 segments 502 and 502, respectively. Replicator 116 determines that L0 segments 535-539 do not need to be replicated because their parent L2 segment 502 matches corresponding target parent L2 segment 502. Thus, L0 segments 535-539 are dropped and not sent to target storage system 105.

FIG. 9 is a flow diagram illustrating a method 900 for replicating a file from a source storage system to a target storage system. Method 900 may be performed by replicator 116 of FIG. 1. Referring now to FIG. 9, at block 905, the replicator determines if a first format of a first segment tree of the first file system is different from a second format of a second segment tree of the second file system representing a file stored in the first and second file systems, respectively, wherein the first and second segment trees each comprises one or more levels of fingerprints, each fingerprint corresponding to one or more deduplicated segments. For example, in response to receiving a target segment tree ID from the target storage system (e.g., as part of transaction 310 of FIG. 3 or transaction 610 of FIG. 6), the replicator determines if the target segment tree format is different from the local/source segment tree format (e.g., as part of operation 320 of FIG. 3 or operation 615 of FIG. 6).

At block 910, the replicator identifies, in response to determining that the first format and second format are different, a second level within the first and second segment trees that have different formats. For example, in response to determining that the format of the local/source segment tree is NON-UST/UST and the format of the target segment tree at the target storage system is UST/NONUST, the replicator identifies level L1 of each segment tree as having a different format.

At block 915, the replicator identifies one or more segments of the second level of the first segment tree that have been modified based on a comparison of fingerprints of a third level of the first and second segment trees (e.g., as part of operation 620 of FIG. 6). For example, referring now to FIG. 7C, the replicator identifies L1 segment 403B of NONUST 471B as being modified because the fingerprint of its parent L2 segment 401B in buffer 450 is different from the fingerprint of the corresponding target L2 segment 401 in buffer 750.

Referring back to FIG. 9, at block 920, for each modified second level segment, the replicator resegments the modified second level segment from the first format to the second format (e.g., as part of operation 625 of FIG. 6). For example, referring now to FIG. 7C, the replicator resegments NONUST L1 segments 403B-404 into new UST L1 segments 423B-425B.

Referring back to FIG. 9, at block 925, the replicator replicates the modified second level segments in the second format from the source storage system to the target storage system (e.g., as part of transaction 630 of FIG. 6). For example, referring again to FIG. 7C, the replicator sends new UST L1 segments 423B-425B to target storage system 105, which uses them to update UST 472B (e.g., as part of operation 635 of FIG. 6).

Figure 10:
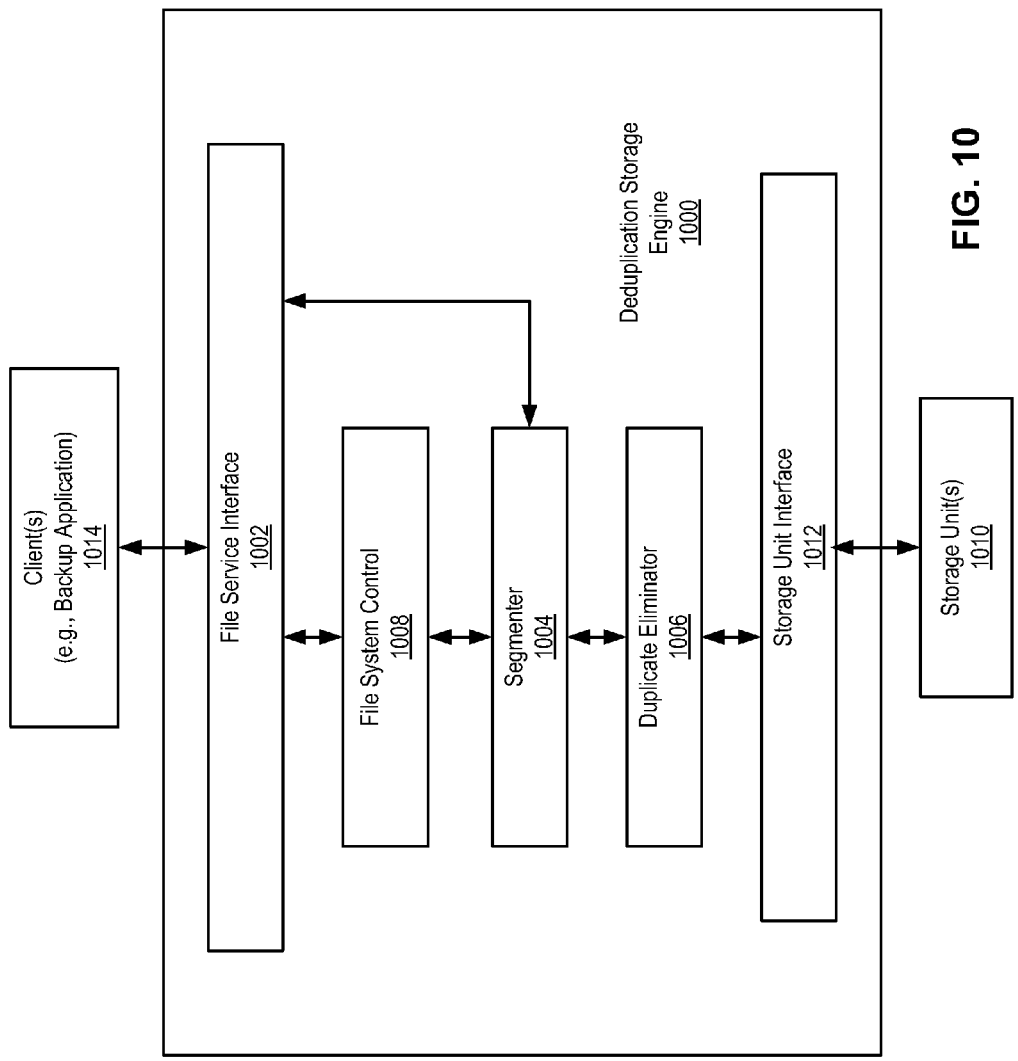
FIG. 10 is a block diagram illustrating a deduplicated storage system according to one embodiment of the invention.

FIG. 10 is a block diagram illustrating a segment storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for replicating a first file from a first file system of a source storage system to a second file system of a target storage system, the method comprising:
    determining that a first format of a first segment tree of the first file system is different from a second format of a second segment tree of the second file system representing a file stored in the first and second file systems, respectively, wherein the first and second segment trees each comprises one or more levels of fingerprints, each fingerprint corresponding to one or more deduplicated segments;
    identifying, in response to determining that the first format and second format are different, a second level within the first and second segment trees that have different formats;
    identifying one or more segments of the second level of the first segment tree that have been modified based on a comparison of fingerprints of a third level of the first and second segment trees;
    for each modified second level segment, resegmenting the modified second level segment from the first format to the second format, wherein resegmenting the modified second level segments comprises dividing the second level segments into new second level segments having a size that is compatible with the second segment tree, wherein the first format is a non-universal segment tree (NONUST) format and the second format is a universal segment tree (UST) format, wherein the second level of the NONUST format comprises of fingerprints each representing a segment that is four megabytes, and the second level of the UST format comprises of fingerprints each representing a segment that is variable in size; and
    replicating the modified second level segments in the second format from the source storage system to the target storage system.

2. The method of claim 1, wherein resegmenting the modified second level segments comprises dividing the second level segments into new second level segments having a size that is compatible with the second segment tree.

3. The method of claim 2, wherein replicating the modified second level segments to the target storage system includes sending the new second level segments to the second file system.

4. The method of claim 1, wherein the first and second segment trees each further comprises a first level segments, wherein each second level segment corresponds to one or more of the first level segments, and wherein resegmenting the modified second level segments comprises:
    for each modified second level segment,
        combining the first level segments that correspond to the modified second level segment;
        dividing the combined first level segments into new first level segments; and
        generating new second level segments that correspond the new first level segments.

5. The method of claim 4, wherein replicating the modified second level segments to the target storage system includes sending the new second level segments and the new first level segments to the target storage system.

6. A non-transitory computer-readable storage medium having instructions stored therein, which when executed by a computer, cause the computer to perform operations, the operations comprising:
   determining that a first format of a first segment tree of the first file system is different from a second format of a second segment tree of the second file system representing a file stored in the first and second file systems, respectively, wherein the first and second segment trees each comprises one or more levels of fingerprints, each fingerprint corresponding to one or more deduplicated segments;
   identifying, in response to determining that the first format and second format are different, a second level within the first and second segment trees that have different formats;
   identifying one or more segments of the second level of the first segment tree that have been modified based on a comparison of fingerprints of a third level of the first and second segment trees;
   for each modified second level segment, resegmenting the modified second level segment from the first format to the second format, wherein resegmenting the modified second level segments comprises dividing the second level segments into new second level segments having a size that is compatible with the second segment tree, wherein the first format is a non-universal segment tree (NONUST) format and the second format is a universal segment tree (UST) format, wherein the second level of the NONUST format comprises of fingerprints each representing a segment that is four megabytes, and the second level of the UST format comprises of fingerprints each representing a segment that is variable in size; and
   replicating the modified second level segments in the second format from the source storage system to the target storage system.

7. The non-transitory computer-readable storage medium of claim 6, wherein resegmenting the modified second level segments comprises dividing the second level segments into new second level segments having a size that is compatible with the second segment tree.

8. The non-transitory computer-readable storage medium of claim 7, wherein replicating the modified second level segments to the target storage system includes sending the new second level segments to the second file system.

9. The non-transitory computer-readable storage medium of claim 6, wherein the first and second segment trees each further comprises a first level segments, wherein each second level segment corresponds to one or more of the first level segments, and wherein resegmenting the modified second level segments comprises:
   for each modified second level segment,
      combining the first level segments that correspond to the modified second level segment;
      dividing the combined first level segments into new first level segments; and
      generating new second level segments that correspond the new first level segments.

10. The non-transitory computer-readable storage medium of claim 9, wherein replicating the modified second level segments to the target storage system includes sending the new second level segments and the new first level segments to the target storage system.

11. A data processing system, comprising:
   a processor; and
   a memory to store instructions, which when executed from the memory, cause the processor to
   determine that a first format of a first segment tree of the first file system is different from a second format of a second segment tree of the second file system representing a file stored in the first and second file systems, respectively, wherein the first and second segment trees each comprises one or more levels of fingerprints, each fingerprint corresponding to one or more deduplicated segments;
   identify, in response to determining that the first format and second format are different, a second level within the first and second segment trees that have different formats;
   identify one or more segments of the second level of the first segment tree that have been modified based on a comparison of fingerprints of a third level of the first and second segment trees;
   for each modified second level segment, resegment the modified second level segment from the first format to the second format, wherein resegmenting the modified second level segments comprises dividing the second level segments into new second level segments having a size that is compatible with the second segment tree, wherein the first format is a non-universal segment tree (NONUST) format and the second format is a universal segment tree (UST) format, wherein the second level of the NONUST format comprises of fingerprints each representing a segment that is four megabytes, and the second level of the UST format comprises of fingerprints each representing a segment that is variable in size; and
   replicate the modified second level segments in the second format from the source storage system to the target storage system.

12. The system of claim 11, wherein resegmenting the modified second level segments comprises dividing the second level segments into new second level segments having a size that is compatible with the second segment tree.

13. The system of claim 12, wherein replicating the modified second level segments to the target storage system includes sending the new second level segments to the second file system.

14. The system of claim 11, wherein the first and second segment trees each further comprises a first level segments, wherein each second level segment corresponds to one or more of the first level segments, and wherein resegmenting the modified second level segments comprises:
   for each modified second level segment,
      combining the first level segments that correspond to the modified second level segment;
      dividing the combined first level segments into new first level segments; and
      generating new second level segments that correspond the new first level segments.

15. The system of claim 14, wherein replicating the modified second level segments to the target storage system includes sending the new second level segments and the new first level segments to the target storage system.

* * * * *